(12) United States Patent
Won et al.

(10) Patent No.: US 12,284,433 B2
(45) Date of Patent: Apr. 22, 2025

(54) ELECTRONIC DEVICE AND METHOD FOR PERFORMING CAPTURING FUNCTION IN ELECTRONIC DEVICE

(71) Applicant: Samsung Electronics Co., Ltd., Suwon-si (KR)

(72) Inventors: Hyunsuk Won, Suwon-si (KR); Sungoh Kim, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 17/854,807

(22) Filed: Jun. 30, 2022

(65) Prior Publication Data

US 2023/0122019 A1 Apr. 20, 2023

Related U.S. Application Data

(63) Continuation of application No. PCT/KR2022/008006, filed on Jun. 7, 2022.

(30) Foreign Application Priority Data

Oct. 14, 2021 (KR) .................. 10-2021-0136351

(51) Int. Cl.
*H04N 23/611* (2023.01)
*H04N 23/60* (2023.01)

(52) U.S. Cl.
CPC ........... *H04N 23/611* (2023.01); *H04N 23/64* (2023.01)

(58) Field of Classification Search
CPC ...... H04N 23/611; H04N 23/64; H04N 23/00; H04N 23/60; H04N 23/57; H04N 23/66; H04N 23/667; G06F 18/00; G06V 40/16

See application file for complete search history.

(56) References Cited

U.S. PATENT DOCUMENTS

| 9,344,673 B1 | 5/2016 | Buchheit et al. |
| 2007/0201724 A1 | 8/2007 | Steinberg et al. |

(Continued)

FOREIGN PATENT DOCUMENTS

| JP | 2010-021956 A | 1/2010 |
| JP | 2012-227830 A | 11/2012 |

(Continued)

OTHER PUBLICATIONS

International Search Report dated Sep. 7, 2022, issued in International Patent Application No. PCT/KR2022/008006.

(Continued)

*Primary Examiner* — Tat C Chio
(74) *Attorney, Agent, or Firm* — Jefferson IP Law, LLP

(57) ABSTRACT

An electronic device is provided. The electronic device includes a camera module, a display, and a processor configured to detect at least one piece of face recognition information based on a plurality of subjects included in an image received in a capture mode where a gaze recognition capturing function is activated, upon identifying a presence of at least two pieces of face recognition information mapped with gaze calibration information among the at least one piece of face recognition information, detect score information about the at least two pieces of face recognition information based on depth information and body information, determine that a subject corresponding to face recognition information including highest score information among the at least two pieces of face recognition information is a capturer, and if the determined capturer gazes at a capture button, perform a first image capturing function of displaying a captured image on the display.

20 Claims, 9 Drawing Sheets

(56) References Cited

U.S. PATENT DOCUMENTS

| | | |
|---|---|---|
| 2010/0149369 A1 | 6/2010 | Yasuda |
| 2011/0216209 A1 | 9/2011 | Fredlund et al. |
| 2013/0202161 A1* | 8/2013 | Shor ................. G06V 40/16 |
| | | 382/118 |
| 2015/0229837 A1 | 8/2015 | Her et al. |
| 2016/0255303 A1 | 9/2016 | Tokui |
| 2017/0041523 A1 | 2/2017 | Rifkin et al. |
| 2017/0094159 A1* | 3/2017 | Priesum ............. H04N 23/611 |
| 2018/0249090 A1* | 8/2018 | Nakagawa .......... H04N 5/2621 |
| 2019/0020803 A1 | 1/2019 | Chen et al. |
| 2021/0067692 A1* | 3/2021 | Dimpas ................ G06V 20/20 |
| 2021/0374447 A1 | 12/2021 | Liu et al. |

FOREIGN PATENT DOCUMENTS

| | | |
|---|---|---|
| JP | 2013-526099 A | 6/2013 |
| JP | 2014-068281 A | 4/2014 |
| JP | 2016-127525 A | 7/2016 |
| JP | 2019-075162 A | 5/2019 |
| KR | 10-2010-0069579 A | 6/2010 |
| KR | 10-2021-0042952 A | 4/2021 |

OTHER PUBLICATIONS

Extended European Search Report dated Sep. 23, 2024, issued in European Application No. 22881151.9-1207.

* cited by examiner

ELECTRONIC DEVICE AND METHOD FOR PERFORMING CAPTURING FUNCTION IN ELECTRONIC DEVICE

CROSS-REFERENCE TO RELATED APPLICATION(S)

This application is a continuation application, claiming priority under § 365(c), of an International application No. PCT/KR2022/008006, filed on Jun. 7, 2022, which is based on and claims the benefit of a Korean patent application number 10-2021-0136351, filed on Oct. 14, 2021, in the Korean Intellectual Property Office, the disclosure of which is incorporated by reference herein in its entirety.

TECHNICAL FIELD

The disclosure relates to a method for performing an image capturing function in an electronic device.

BACKGROUND ART

An image may be captured using various image capturing functions, through a camera module included in an electronic device.

The user of the electronic device may perform the image capturing function using direct entry on the capture button, an automatic timer capturing function, or a hand gesture in the capture mode for receiving images.

The above information is presented as background information only to assist with an understanding of the disclosure. No determination has been made, and no assertion is made, as to whether any of the above might be applicable as prior art with regard to the disclosure.

DISCLOSURE

Technical Problem

In the capture mode for receiving images, the gaze of the subject may be recognized to perform the image capturing function. To recognize the gaze of the subject in the capture mode, the operation of calibrating the gaze of the subject should be performed.

Upon receiving an image including a plurality of subjects in the selfie capture mode, when performing the gaze calibration operation on the plurality of subjects, it is hard to separately identify the subject on which the gaze calibration operation has been performed among the plurality of subjects, so that it is impossible to determine the capturer to perform the capturing function with gaze among the plurality of subjects. Accordingly, upon receiving an image including a plurality of subjects in the selfie capture mode, it may be impossible to perform the capturing function using the capturer's gaze.

Aspects of the disclosure are to address at least the above-mentioned problems and/or disadvantages and to provide at least the advantages described below. Accordingly, an aspect of the disclosure is to provide a method for performing an image capturing function in an electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a camera module, a display, and a processor configured to detect at least one piece of face recognition information based on a plurality of subjects included in an image received in a capture mode where a gaze recognition capturing function is activated, upon identifying a presence of at least two pieces of face recognition information mapped with gaze calibration information among the at least one piece of face recognition information, detect score information about the at least two pieces of face recognition information based on depth information and body information, determine that a subject corresponding to face recognition information including highest score information among the at least two pieces of face recognition information is a capturer, and if the determined capturer gazes at a capture button, perform a first image capturing function of displaying a captured image on the display.

In accordance with another aspect of the disclosure, a method for performing a capturing function in an electronic device is provided. The method includes detecting at least one piece of face recognition information based on a plurality of subjects included in an image received in a capture mode where a gaze recognition capturing function is activated, upon identifying a presence of at least two pieces of face recognition information mapped with gaze calibration information among the at least one piece of face recognition information, detecting score information about the at least two pieces of face recognition information based on depth information and body information, determining that a subject corresponding to face recognition information including highest score information among the at least two pieces of face recognition information is a capturer, and if the determined capturer gazes at a capture button, performing a first image capturing function of displaying a captured image on a display of the electronic device.

Advantageous Effects

According to various embodiments, upon receiving an image including a plurality of subjects in the selfie capture mode, it is possible to conveniently perform the image capturing function with the gaze of the capturer among the plurality of subjects.

Further, upon receiving an image including a plurality of subjects in the selfie capture mode, it is possible to provide another capturing function when a capturer may not be determined among the plurality of subjects.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
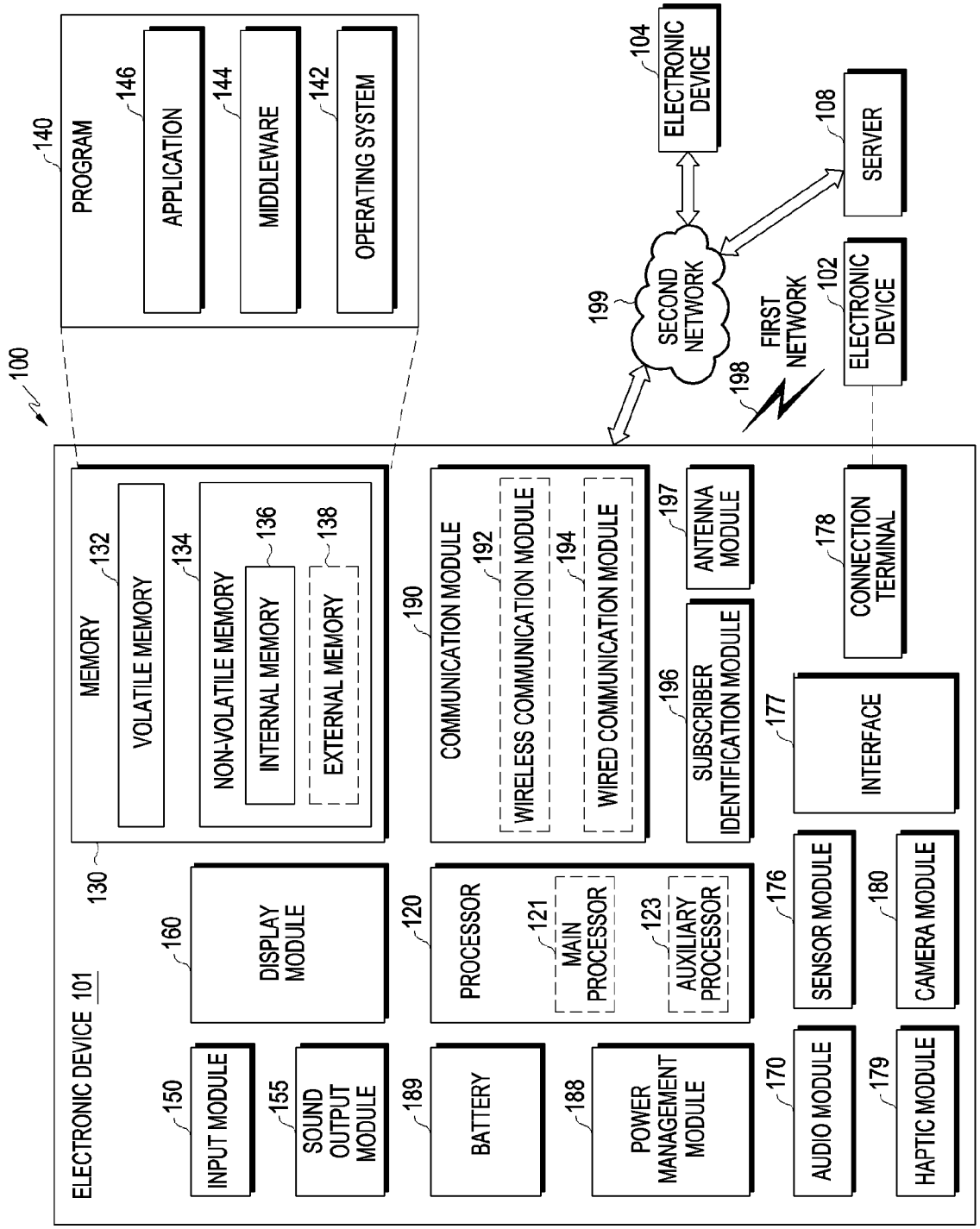
FIG. 1 is a view illustrating an electronic device in a network environment according to an embodiment of the disclosure.

FIG. 1 is a block diagram 101 illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5th generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
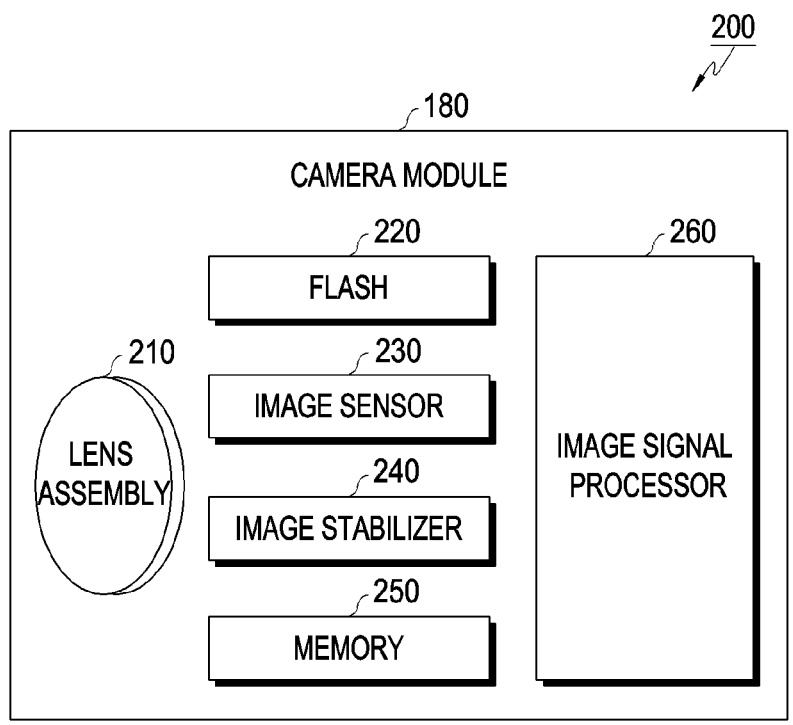
FIG. 2 is a block diagram illustrating a camera module according to an embodiment of the disclosure.

FIG. 2 is a block diagram 200 illustrating a camera module according to an embodiment of the disclosure.

Referring to FIG. 2, in a block diagram 200, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In this case, the camera module 180 may be, e.g., a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one different lens attribute from another lens assembly. The lens assembly 210 may include, for example, a wide-angle lens or a telephoto lens. The flash 220 may emit light that is used to reinforce light from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented as, e.g., a charged coupled device (CCD) sensor or a complementary metal oxide semiconductor (CMOS) sensor.

The image stabilizer 240 may move in a particular direction, or control (e.g., adjust the read-out timing of), the image sensor 230 or at least one lens included in the lens assembly 210 to at least partially compensate for a negative effect (e.g., image blurring) on a captured image, which is caused by the motion of the camera module 180 or the electronic device 101 including the camera module 180, in response to the motion. According to an embodiment, the image stabilizer 240 may be implemented as, e.g., an optical image stabilizer. The image stabilizer 240 may sense such movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, when image capturing is delayed due to shutter lag or multiple images are quickly captured, a raw image obtained (e.g., a high-resolution image) may be stored in the memory 250, and its corresponding copy (e.g., a low-resolution image) may be previewed through the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 250 or as a separate memory that is operated independently from the memory 250.

The image signal processor 260 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 101, the electronic device 102, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed through the display module 160 as they are or after further processed by the processor 120.

According to an embodiment, the electronic device 101 may include two or more camera modules 180 with different attributes or functions. In this case, at least one of the camera modules 180 may be, e.g., a wide-angle camera or a front camera while at least one other camera module may be a telephoto camera or a rear camera.

Figure 3:
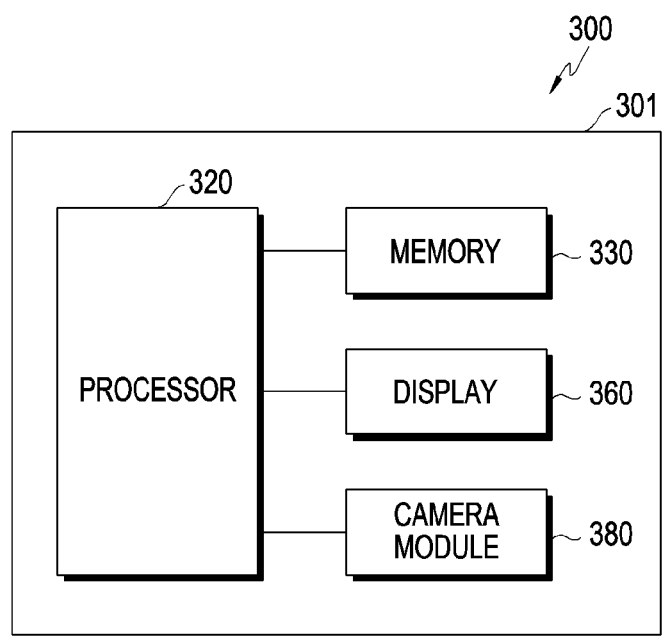
FIG. 3 is a block diagram illustrating an electronic device according to an embodiment of the disclosure.

FIG. 3 is a block diagram 300 illustrating an electronic device according to an embodiment of the disclosure.

Figure 4:
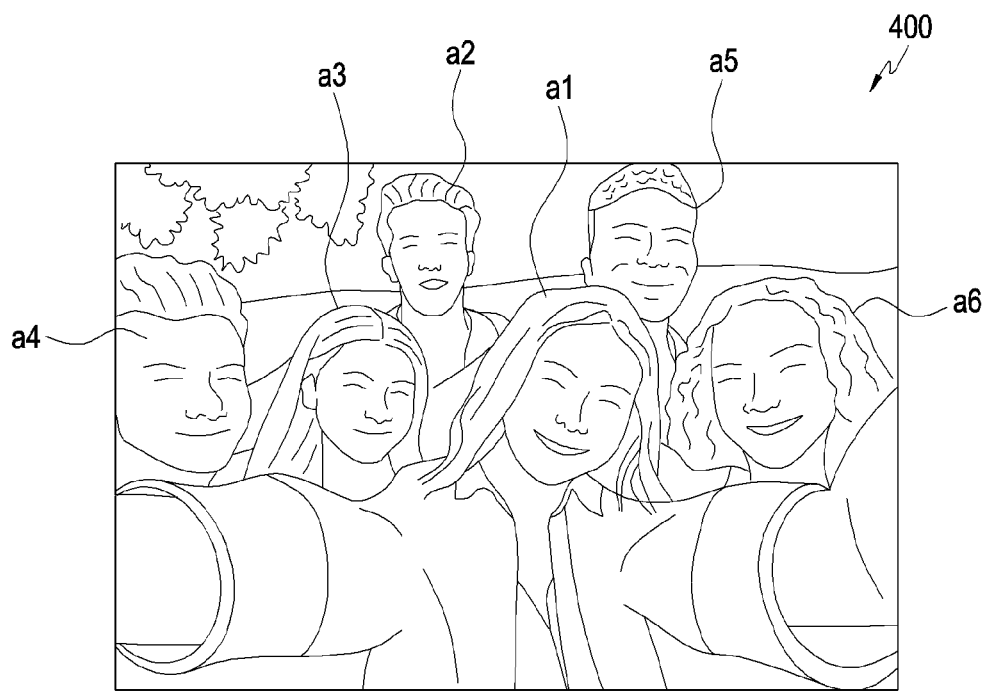
FIG. 4 is a view illustrating depth information in an electronic device according to an embodiment of the disclosure.

FIG. 4 is a view 400 illustrating depth information in an electronic device according to an embodiment of the disclosure.

Figure 5:
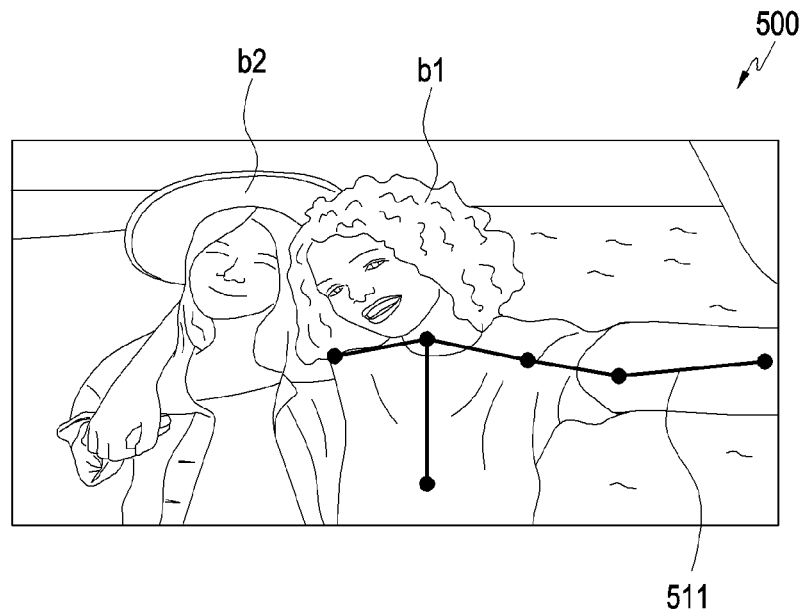
FIG. 5 is a view illustrating body information in an electronic device according to an embodiment of the disclosure.

FIG. 5 is a view 500 illustrating body information in an electronic device according to an embodiment of the disclosure.

Figure 6:
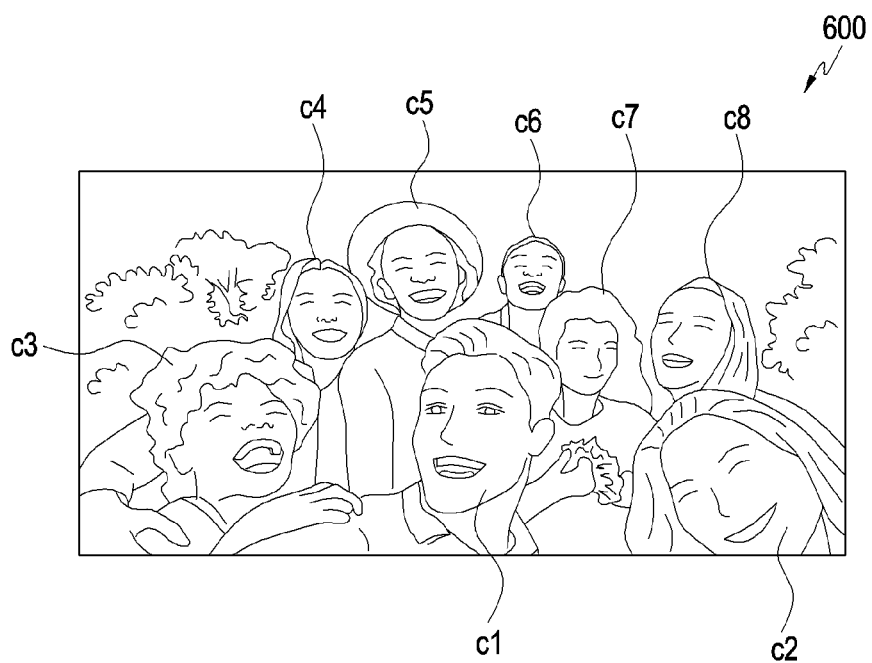
FIG. 6 is a view illustrating a state in which a capturer may not be determined in an electronic device according to an embodiment of the disclosure.

FIG. 6 is a view 600 illustrating a state in which a capturer may not be determined in an electronic device according to an embodiment of the disclosure.

Referring to FIG. 3, according to various embodiments, an electronic device 301 (e.g., the electronic device 101 of FIG. 1) may include a processor 320, a memory 330, a display 360, and a camera module 380.

According to various embodiments, in a capture mode in which a gaze recognition capturing function has been activated, the processor 320 may detect at least one piece of face recognition information based on a plurality of subjects included in a received image, detect at least one piece of gaze calibration information about at least one subject corresponding to the at least one piece of face recognition information, and map and store the at least one piece of face recognition information and the at least one piece of gaze calibration information.

According to an embodiment, if a camera application is executed, the processor 320 may display, on the display 360, the image received in realtime through the camera module 380 in the capture mode.

According to another embodiment, the processor 320 may recognize the face for each of the plurality of subjects included in the image received in the capture mode, using a face recognition function. The processor 320 may identify at least one piece of face recognition information (e.g., name or nickname) mapped to the at least one recognized face, based on the face recognition information (e.g., name or nickname) which is mapped to the face information (e.g., face feature information) and stored in the memory 330.

According to yet another embodiment, the processor 320 may recognize the gaze of at least one subject corresponding to the at least one piece of face recognition information among the plurality of subjects included in the image received in the capture mode, using a gaze calibration function, and may detect at least one piece of gaze calibration information based on the recognized gazed For example, the processor 320 may compare when the subject gazes at a specific portion of each edge of the display 360 in the capture mode and when the subject gazes at the front of the camera module 380 and store changes in the moving distance and angle of the pupil of the gaze and store it as gaze calibration information. The gaze calibration information may be for precisely calculating the direction of the gaze and may differ per subject.

According to yet another embodiment, the processor 320 may map the at least one piece of face recognition information and the at least one piece of gaze calibration information and store them in the memory 330.

According to various embodiments, the processor 320 may determine the capturer capable of performing the capturing function with gaze, among the plurality of subjects included in the image received in the capture mode, based on mapping information about the at least one piece of face recognition information and the at least one piece of gaze calibration information stored in the memory 330.

According to yet another embodiment, upon identifying the presence of at least two pieces of face recognition information mapped with the gaze calibration information among the at least one piece of face recognition information, based on the mapping information about the at least one piece of face recognition information and the at least one piece of gaze calibration information stored in the memory 330, the processor 320 may detect score information about the at least two pieces of face recognition information using depth information and body information about each of at least two subjects corresponding to the at least two pieces of face recognition information.

According to an embodiment, the processor 320 may detect distance information about distance information between the camera module 380 and each of the at least two subjects corresponding to the at least two pieces of face recognition information, as the depth information.

Referring to FIG. 4, in a view 400, when a plurality of subjects are captured, the subject a1 corresponding to the capturer among the plurality of subjects a1 to a6 is positioned closest to the camera module 380 as compared with the other subjects a2 to a6. Thus, the subject a1 having the depth information closest to the camera module 380 may be assigned high score information, so that the subject a1 may be determined as the capturer.

According to an embodiment, the processor 320 may detect the body information based on skeleton information about each of at least two subjects corresponding to the at least two pieces of face recognition information. The processor 320 may assign high score information to the subject having the body information indicating that the shoulder and arm face close to the direction where the camera module 380 is positioned, based on the body information about the at least two subjects and may thus determine the subject having the high score information as the capturer.

Referring to FIG. 5, in a view 500, when the pieces of distance information between the camera module 380 and the plurality of subjects b1 and b2 are identical or similar to each other, the pieces of depth information about the plurality of subjects may be identical or similar, so that it may be impossible to determine the subject b1 corresponding to the capturer among the plurality of subjects b1 and b2 using only the depth information. Or, when the head of the subject corresponding to a non-capturer is big or the subject corresponding to the capturer is intentionally included between the subjects corresponding to the non-capturers, the depth information about the subject corresponding to the capturer may not be determined to be closest. Accordingly, in the selfie capture mode, since the shoulder and arm of the subject b1 corresponding to the capturer among the plurality of subjects holds the electronic device 301 including the camera module 380, the subject b1 having the body information 511 in which the shoulder and arm face the electronic device 301 including the camera module 380 may be determined as the capturer. Further, in the selfie capture mode using the camera module provided on the rear surface of the electronic device 301, the angle of view is larger than when capturing using the camera module provided on the front surface of the electronic device 301, so that the capturer may be determined more usefully using the body information.

According to an embodiment, the processor 320 may detect score information about each of the at least two pieces of face recognition information through Equation 1 below.

$$Score=Depth*\alpha+Skeleton*(1-\alpha) \quad \text{Equation 1}$$

In Equation 1, "Depth" may denote the depth information, e.g., a value between 0 and 10, meaning that it is closer as the value of the depth information increases. A depth information value preset depending on the distance between the subject and the camera module may be applied to "Depth."

In Equation 1, "Skelton" may denote the body information, e.g., a value between 0 and 10, meaning that it is closer to the direction of the camera module as the body information value increases. A body information value preset depending on the direction of the camera module and the body information about the subject may be applied to "Skeleton."

In Equation 1, "a" may be set to "$0.5<\alpha<=1$", and may be set to, e.g., "0.7."

According to an embodiment, the processor 320 may detect score information about each of the at least two pieces of face recognition information and determine that the subject corresponding to the face recognition information having the highest score among the at least two pieces of face recognition information is the capturer.

According to an embodiment, the processor 320 may detect the score information about each of the at least two pieces of face recognition information, determine the face recognition information having the highest score among the at least two pieces of face recognition information, and if the highest score information is equal to or larger than a threshold pre-stored in the memory 330 to determine the capturer using the score information, determine that the subject corresponding to the face recognition information including the highest score information is the capturer.

According to an embodiment, if the gaze of the determined capturer is at the capture button, the processor 320 may perform a first image capturing function of capturing an image and displaying the captured image on the display 360.

According to various embodiments, upon identifying the presence of one piece of face recognition information mapped with the gaze calibration information among the at least one piece of face recognition information, based on the mapping information about the at least one piece of face recognition information and the at least one piece of gaze calibration information stored in the memory 330, the processor 320 may determine the subject corresponding to the one piece of face recognition information, as the capturer. If the gaze of the determined capturer is at the capture button for performing the image capturing function, the processor 320 may perform the first image capturing function of capturing an image and displaying the captured image on the display 360.

According to various embodiments, in a state of being unable to determine the capturer among the plurality of subjects included in the received image in the capture mode, the processor 320 may deactivate the gaze recognition capturing function and activate another set capturing function.

According to an embodiment, upon failing to recognize a face in the image received in the capture mode, the processor 320 may determine that it is the state of being unable to determine the capturer, deactivate the gaze recognition capturing function, and activate another set capturing function.

According to an embodiment, upon identifying the absence of the face recognition information mapped with the gaze calibration information among the at least one piece of face recognition information, based on the mapping information about the at least one piece of face recognition information and the at least one piece of gaze calibration information stored in the memory 330, the processor 320 may determine that it is the state of being unable to determine the capturer, deactivate the gaze recognition capturing function, and activate another set capturing function.

According to an embodiment, the processor 320 may identify the presence of at least two pieces of face recognition information mapped with the gaze calibration information among the at least one piece of face recognition information based on the mapping information about the at least one piece of face recognition information and the at least one piece of gaze calibration information stored in the memory 330, detect score information about the at least two pieces of face recognition information using depth information and body information about each of the at least two subjects corresponding to the at least two pieces of face recognition information and, if the score information having the highest score information about each of the at least two pieces of face recognition information is equal to or smaller than the threshold pre-stored in the memory 330 to determine the capturer using the score information, determine that it is in the state of being unable to determine the capturer, deactivate the gaze recognition capturing function, and activate another set capturing function.

Referring to FIG. 6, in a view 600, when the subject c2 corresponding to a non-capturer among the plurality of subjects c1 to c8 is positioned closer to the camera module 380 than the subject c1 corresponding to the capturer is, and the body information (e.g., shoulder or arm) about the subject corresponding to the capturer may not be detected, the processor 320 may determine that it is the state of being unable to determine the capturer.

According to various embodiments, in a state of being unable to determine the capturer among the plurality of subjects included in the received image in the capture mode, the processor 320 may deactivate the gaze recognition capturing function and, upon identifying the automatic timer capturing function as the other set capturing function, activate the automatic timer capturing function.

According to an embodiment, if the automatic timer capturing function is activated, the processor 320 may detect whether the plurality of subjects included in the image received in the capture mode move and, upon detecting no movement of the plurality of subjects, detect whether the plurality of subjects gaze at the front of the camera module 380. If the plurality of subjects are detected as gazing at the front of the camera module 380, the processor 320 may perform the first image capturing function of capturing an image and displaying the captured image on the display 360.

According to an embodiment, upon detecting that the plurality of subjects do not gaze at the front of the camera module 380, the processor 320 may perform a second image capturing function of capturing an image every predetermined time and storing the captured images in the memory 330 without displaying the images on the display 360.

According to an embodiment, the processor 320 may determine when the plurality of subjects gaze at the front of the camera module 380 and when the plurality of subjects do not gaze at the front of the camera module 380 while performing the first image capturing function or the second image capturing function.

According to an embodiment, if the time of the automatic timer expires so that the automatic timer capturing function is terminated, the processor 320 may display, on the display 360, at least one image captured by the first image capturing function or at least one image captured by the second image capturing function.

According to various embodiments, the memory 330 may be implemented to be substantially the same or similar to the memory 130 of FIG. 1.

According to an embodiment, the memory 330 may store at least one piece of face recognition information recognized from the plurality of subjects included in the image received in the capture mode, at least one piece of gaze calibration information detected from at least one subject corresponding to the at least one piece of face recognition information, at least one piece of depth information about the at least one subject, and at least one piece of body information about the at least one subject.

According to an embodiment, the memory 330 may store at least one image captured by the first capturing function or at least one image captured by the second capturing function.

According to various embodiments, the display 360 may be implemented in substantially the same or similar manner to the display module 160 of FIG. 1.

According to an embodiment, the display 360 may display at least one image captured by the first image capturing function or at least one image captured by the second image capturing function selectable by the user.

According to various embodiments, the camera module 380 may be implemented in substantially the same or similar manner to the camera module 180 of FIG. 1 and/or the camera module 180 of FIG. 2.

Figure 7:
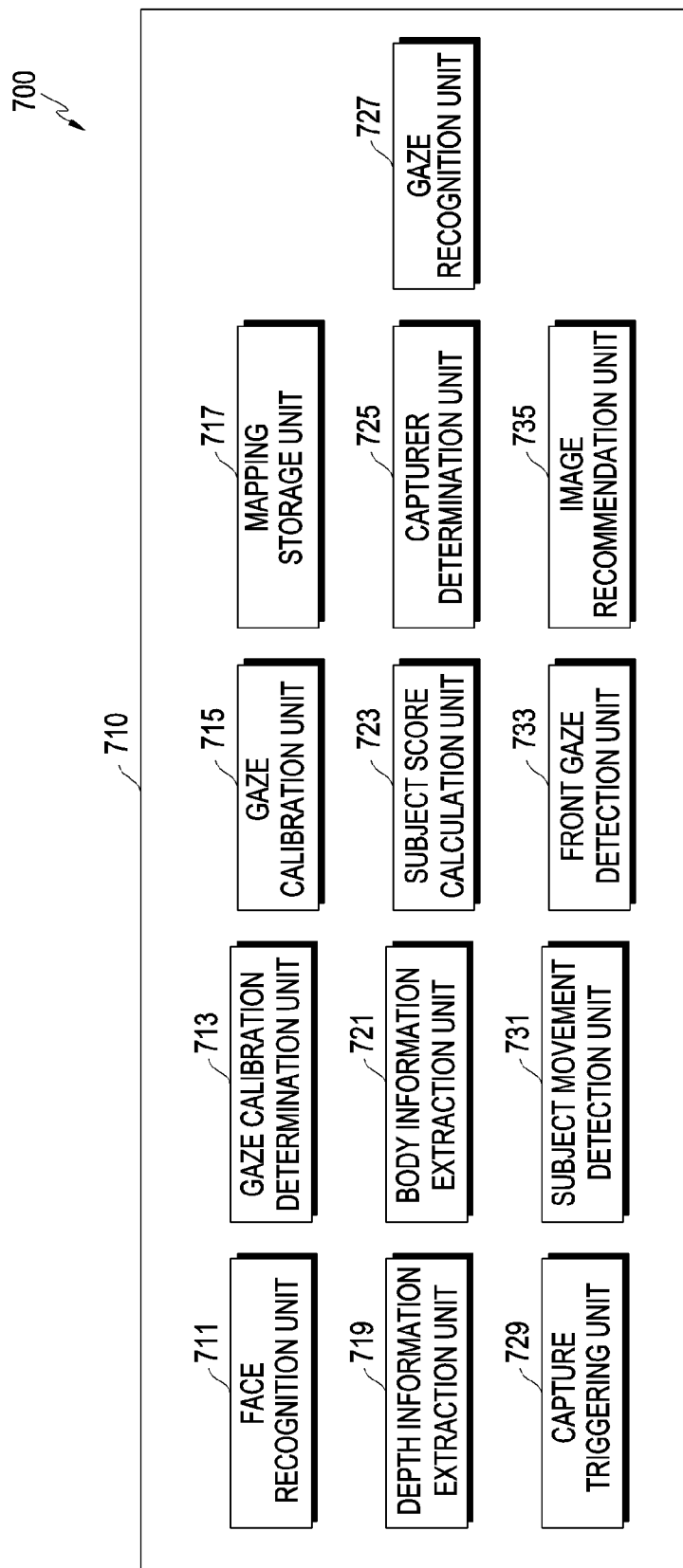
FIG. 7 is a block diagram illustrating a processor for performing a capturing function in an electronic device according to an embodiment of the disclosure.

FIG. 7 is a block diagram 700 illustrating a processor for performing a capturing function in an electronic device according to an embodiment of the disclosure.

Referring to FIG. 7, in a block diagram, 700, a processor 710 (e.g., the processor 320 of FIG. 3) may include a face recognition unit 711, a gaze calibration determination unit 713, a gaze calibration unit 715, a mapping storage unit 717, a depth information extraction unit 719, a body information extraction unit 721, a subject score calculation unit 723, a capturer determination unit 725, a gaze recognition unit 727, a capture triggering unit 729, a subject movement detection unit 731, a front gaze detection unit 733, and an image recommendation unit 735.

According to various embodiments, the face recognition unit 711 may recognize the faces of a plurality of subjects included in the image received in the capture mode using a face recognition function and detect at least one piece of face recognition information (e.g., a person's name or nickname, or identifier) corresponding to the at least one piece of recognized face.

According to various embodiments, the gaze calibration determination unit 713 may determine whether there is at least one piece of gaze calibration information mapped to the at least one piece of face recognition information detected by the face recognition unit 711. If there if at least one piece of face recognition information lacking gaze calibration information among the at least one piece of face recognition information based on the plurality of subjects included in the image received in the capture mode, the gaze calibration determination unit 713 may notify the gaze calibration unit 715 of performing the gaze calibration operation for at least one subject corresponding to the at least one piece of face recognition information.

According to various embodiments, the gaze calibration unit 715 may perform the gaze calibration operation for at least one subject corresponding to the at least one piece of face recognition information detected by the face recognition unit 711, detecting at least one piece of gaze calibration information.

According to an embodiment, the gaze calibration unit 715 may compare when the subject gazes at a specific portion of each edge of the display (e.g., the display 360 of FIG. 6) in the capture mode and when the subject gazes at the front of the camera module (e.g., the camera module 380 of FIG. 3) and store changes in the moving distance and angle of the pupil of the subject's gaze and store it as gaze calibration information.

According to various embodiments, the mapping storage unit 717 may map the at least one piece of face recognition information detected by the face recognition unit 711 and the at least one piece of gaze calibration information detected by the gaze calibration unit 715 and store them in the memory (e.g., the memory 330 of FIG. 3).

According to various embodiments, the depth information extraction unit 719 may detect distance information between the camera module (e.g., the camera module 380 of FIG. 3) and each of at least one subject corresponding to at least one piece of face recognition information in the capture mode, as the depth information.

According to various embodiments, the body information extraction unit 721 may detect body information about the subject in which the shoulder and arm faces the camera module (e.g., the camera module 380 of FIG. 3) based on skeleton information about each of the at least one subject corresponding to the at least one piece of face recognition information.

According to various embodiments, the subject score calculation unit 723 may detect the score information about each subject using depth information and body information about each of the at least one subject corresponding to the at least one piece of face recognition information.

According to an embodiment, the subject score calculation unit 723 may calculate score information about each of the at least one subject corresponding to the at least one piece of face recognition information using Equation 1 above.

According to various embodiments, the capturer determination unit 725 may determine the subject having the highest score information among the score information calculated by the subject score calculation unit 723, as the capturer.

According to an embodiment, if the highest score information among the score information calculated by the subject score calculation unit 723 is equal to or larger than a threshold pre-stored in the memory 330 to determine the capturer using the score information, the capturer determination unit 725 may determine the subject having the highest score as the capturer.

According to an embodiment, if the highest score information among the score information calculated by the subject score calculation unit 723 is equal to or smaller than the threshold, the capturer determination unit 725 may determine that it is the state of being unable to determine the capturer.

According to various embodiments, in the state of being unable to determine the capturer, the capture triggering unit 729 may deactivate the gaze recognition capturing function and active another set capturing function (e.g., an automatic timer capturing function or a capturing function using a hand gesture).

According to various embodiments, the subject movement detection unit 731 may detect a movement for the plurality of subjects included in the image received in the capture mode.

According to various embodiments, the subject movement detection unit 731 may detect whether each of the plurality of subjects included in the image received in the capture mode gazes at the front of the camera module (e.g., the camera module 380 of FIG. 3).

According to various embodiments, the image recommendation unit 735 may recommend at least one captured by the first capturing function or at least one image captured by the second capturing function during the automatic timer capturing function to the user or may display it on the display (e.g., the display 360 of FIG. 3) to be selected by the user.

According to various embodiments, an electronic device (e.g., the electronic device 301 of FIG. 3) may comprise a camera module (e.g., the camera module 380 of FIG. 3), a display (e.g., the display 360 of FIG. 3), and a processor (e.g., the processor 320 of FIG. 3) configured to detect at least one piece of face recognition information based on a plurality of subjects included in an image received in a capture mode where a gaze recognition capturing function is activated, upon identifying a presence of at least two pieces of face recognition information mapped with gaze calibration information among the at least one piece of face recognition information, detect score information about the at least two pieces of face recognition information based on depth information and body information, determine that a subject corresponding to face recognition information including highest score information among the at least two pieces of face recognition information is a capturer, and if the determined capturer gazes at a capture button, perform a first image capturing function of displaying a captured image on the display.

According to various embodiments, the processor may be configured to recognize at least one face among the plurality of subjects included in the image received in the capture mode and detect the at least one piece of face recognition information corresponding to the at least one recognized face.

According to various embodiments, the processor may be configured to detect at least one piece of gaze calibration information by performing a gaze calibration operation on at least one subject corresponding to the at least one piece of face recognition information, and map and store the at least one piece of face recognition information and the at least one piece of gaze calibration information.

According to various embodiments, the processor may be configured to detect distance information between the camera module and each of at least two subjects corresponding to the at least two pieces of face recognition information, as the depth information.

According to various embodiments, the processor may be configured to detect the body information based on skeleton information about each of at least two subjects corresponding to the at least two pieces of face recognition information.

According to various embodiments, the processor may be configured to determine the face recognition information having the highest score information among the at least two pieces of face recognition information and, if the highest score information is a threshold or more, determine the subject corresponding to the face recognition information having the highest score information, as the capturer.

According to various embodiments, the processor may be configured to, upon identifying a presence of one piece of face recognition information mapped with the gaze calibration information among the at least one piece of face recognition information, determine that a subject corresponding to the one piece of face recognition information is the capturer and, if the determined capturer gazes at the capture button, perform the first image capturing function.

According to various embodiments, the processor may be configured to deactivate a gaze recognition capturing function and activate another set capturing function if becoming a state of being unable to determine the capturer.

According to various embodiments, the processor may be configured to, if an automatic timer capturing function is activated as the other set capturing function, detect whether there is a movement for the plurality of subjects included in the image, if the movement for the plurality of subjects is not detected, detect whether the plurality of subjects gaze at a front of the camera module, upon detecting that the plurality of subjects gaze at the front of the camera module, perform the first image capturing function, and upon detecting that the plurality of subjects do not gaze at the front of the camera module, perform a second image capturing function of not displaying the captured image on the display, every predetermined time.

According to various embodiments, the processor may be configured to display, on the display, at least one image captured by the first image capturing function and at least one image captured by the second image capturing function.

Figure 8:
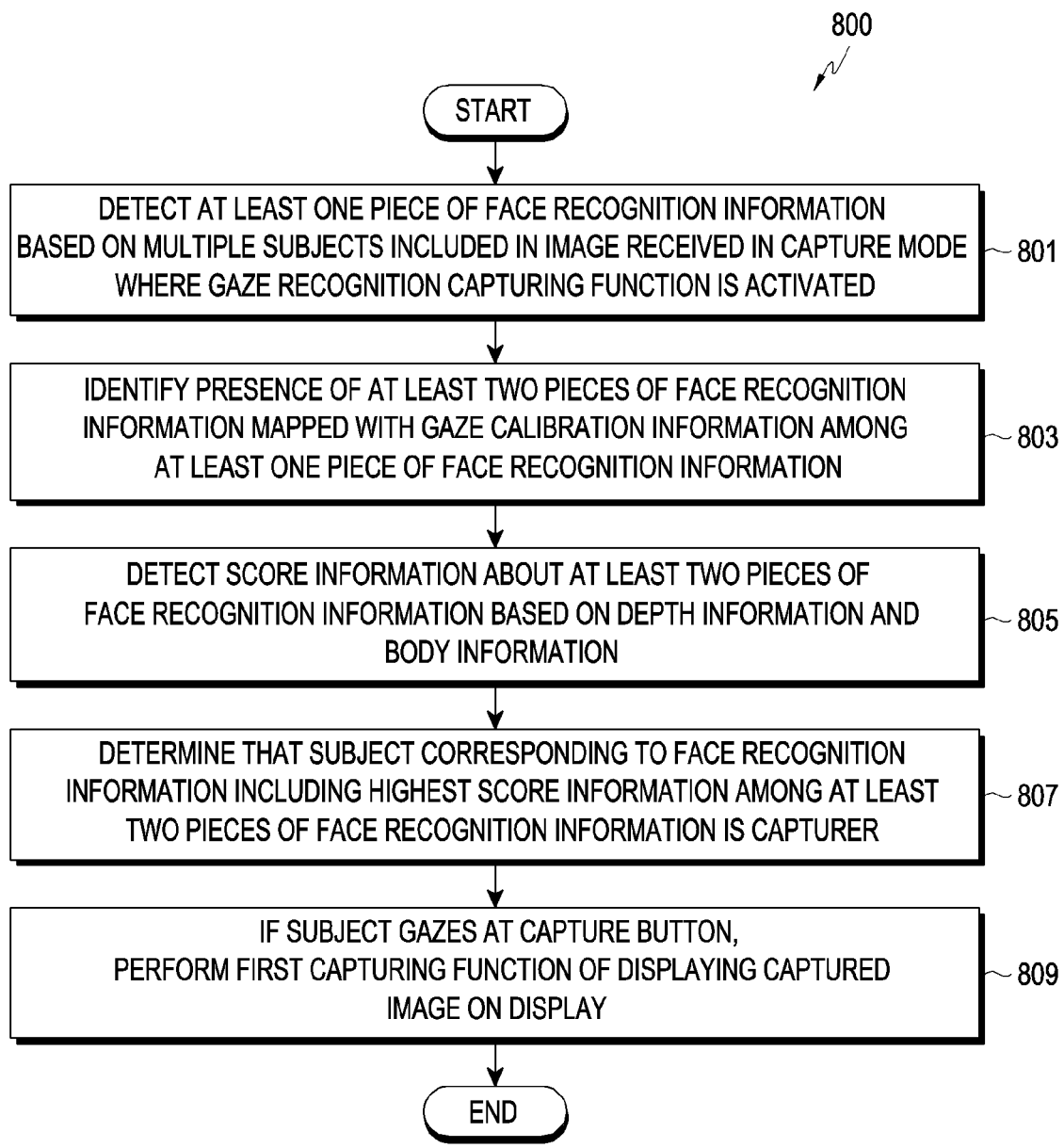
FIG. 8 is a flowchart illustrating an operation of performing a capturing function in an electronic device according to an embodiment of the disclosure.

FIG. 8 is a flowchart 800 illustrating an operation of performing a capturing function in an electronic device according to an embodiment of the disclosure.

Referring to FIG. 8, in a method 800, the operations of performing the capturing function may include operations 801 to 809. According to an embodiment, at least one of operations 801 to 809 may be omitted or changed in order or may add other operations. Operations 801 to 809 may be performed by, e.g., a component (e.g., the processor 120 of FIG. 1 or the processor 320 of FIG. 3) of an electronic device (e.g., the electronic device 101 of FIG. 1 or the electronic device 301 of FIG. 3).

In operation 801, the electronic device (e.g., the electronic device 101 of FIG. 1 or the electronic device 301 of FIG. 3) may detect at least one piece of face recognition information based on the plurality of subjects included in the image received in the capture mode in which the gaze recognition capturing function is activated.

According to another embodiment, the electronic device may switch into the capture mode as the camera application is executed and, in the capture mode, display, on the display (e.g., the display 360 of FIG. 3), the image received in realtime through the camera module 380.

According to yet another embodiment, the electronic device may recognize the faces of the plurality of subjects included in the image received in the capture mode, using the face recognition function. The electronic device may detect at least one piece of face recognition information (e.g., name or nickname) based on the at least one recognized face, based on the face recognition information (e.g., name or nickname) which is mapped to the face information (e.g., face feature information) and stored in the memory (e.g., the memory 330 of FIG. 2).

In operation 803, the electronic device (e.g., the electronic device 101 of FIG. 1 or the electronic device 301 of FIG. 3) may identify the presence of at least two pieces of face recognition information mapped with gaze calibration information among at least one piece of face recognition information.

According to yet another embodiment, the electronic device may recognize the gaze of at least one subject corresponding to the at least one piece of face recognition information among the plurality of subjects included in the image received in the capture mode, using a gaze calibration function.

For example, the electronic device may compare when the subject gazes at a specific portion of each edge of the display 360 in the capture mode and when the subject gazes at the front surface of the camera module 380 and store changes in the moving distance and angle of the pupil of the gaze and store it as gaze calibration information. The gaze calibration information may be for precisely calculating the direction of the gaze and may differ per subject.

According to yet another embodiment, the electronic device may map the at least one piece of face recognition information and the at least one piece of gaze calibration information and store them in the memory (e.g., the memory 330).

According to yet another embodiment, the electronic device may identify the presence of at least two pieces of face recognition information mapped with gaze calibration information among the at least one piece of face recognition information based on the mapping information about the at least one piece of face recognition information and the at least one piece of gaze calibration information stored in the memory.

In operation 805, the electronic device (e.g., the electronic device 101 of FIG. 1 or the electronic device 301 of FIG. 3) may detect score information about the at least two pieces of face recognition information based on the depth information and body information.

According to yet another embodiment, upon identifying the presence of at least two pieces of face recognition information mapped with the gaze calibration information among the at least one piece of face recognition information, based on the mapping information about the at least one piece of face recognition information and the at least one piece of gaze calibration information stored in the memory (e.g., the memory 330), the electronic device may detect score information about the at least two pieces of face recognition information using depth information and body information about each of at least two subjects corresponding to the at least two pieces of face recognition information.

According to an embodiment, the electronic device may detect score information about each of the at least two pieces of face recognition information through Equation 1 below.

In operation 807, the electronic device (e.g., the electronic device 101 of FIG. 1 or the electronic device 301 of FIG. 3) may determine that the subject corresponding to the face recognition information including the highest score information among at least two pieces of face recognition information is the capturer.

According to yet another embodiment, the electronic device may detect score information about each of the at least two pieces of face recognition information and determine that the subject corresponding to the face recognition information having the highest score among the at least two pieces of face recognition information is the capturer.

According to yet another embodiment, the electronic device may detect the score information about each of the at least two pieces of face recognition information, determine the face recognition information having the highest score among the at least two pieces of face recognition information, and if the highest score information is equal to or larger than a threshold pre-stored in the memory 330 to determine the capturer using the score information, determine that the subject corresponding to the face recognition information including the highest score information is the capturer.

In operation 809, the electronic device (e.g., the electronic device 101 of FIG. 1 or the electronic device 301 of FIG. 3) may perform the first image capturing function of displaying the captured image on the display if the capturer gazes at the capture button.

According to yet another embodiment, if the gaze of the determined capturer is at the capture button, the electronic device may perform a first image capturing function of capturing an image and displaying the captured image on the display 360.

Figure 9:
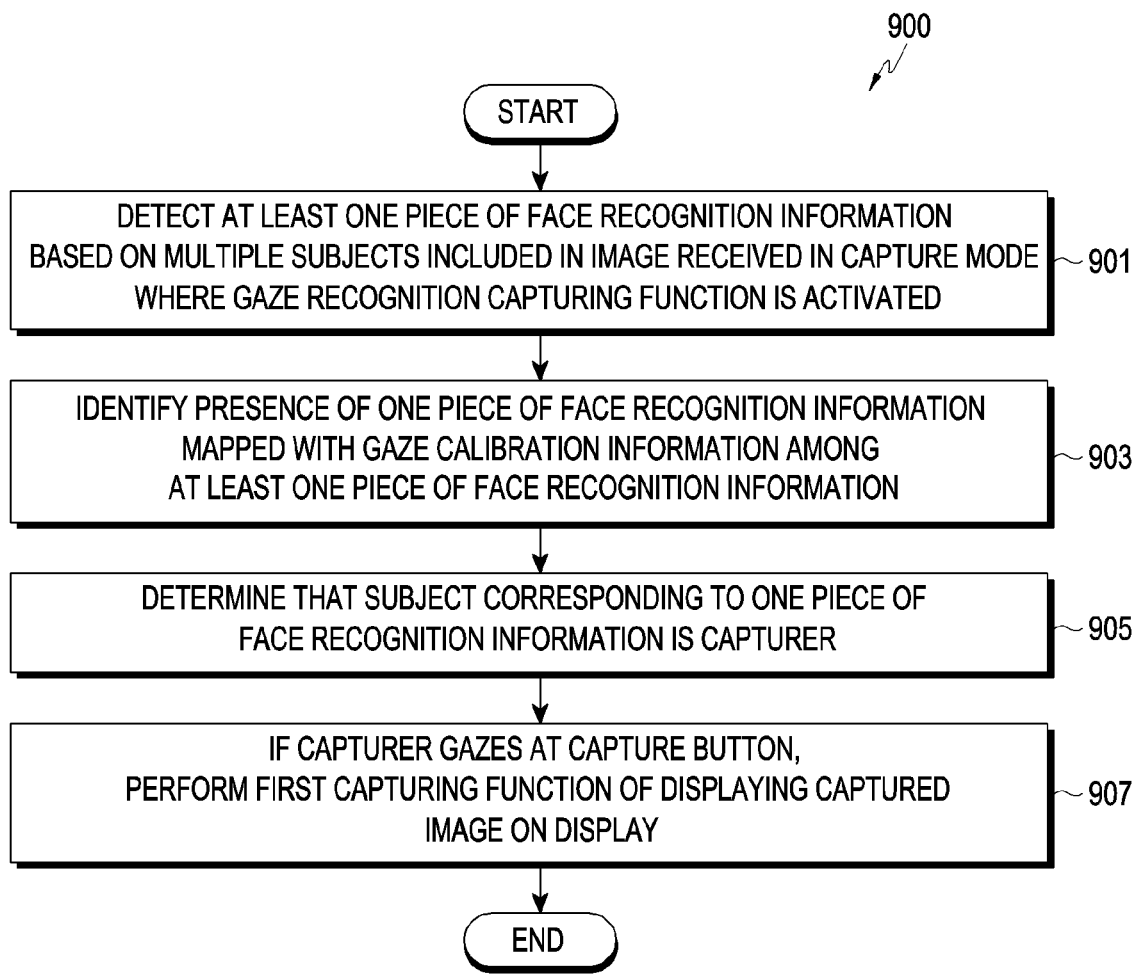
FIG. 9 is a flowchart illustrating an operation of performing a capturing function in an electronic device according to an embodiment of the disclosure.

FIG. 9 is a flowchart 900 illustrating an operation of performing a capturing function in an electronic device according to an embodiment of the disclosure.

Referring to FIG. 9, in a method 900, the operations of performing the capturing function may include operations 901 to 907. According to an embodiment, at least one of operations 901 to 907 may be omitted or changed in order or may add other operations. Operations 901 to 907 may be performed by, e.g., a component (e.g., the processor 120 of FIG. 1 or the processor 320 of FIG. 3) of an electronic device (e.g., the electronic device 101 of FIG. 1 or the electronic device 301 of FIG. 3).

In operation 901, the electronic device (e.g., the electronic device 101 of FIG. 1 or the electronic device 301 of FIG. 3) may detect at least one piece of face recognition information based on the plurality of subjects included in the image received in the capture mode in which the gaze recognition capturing function is activated.

According to another embodiment, the electronic device may switch into the capture mode as the camera application is executed and, in the capture mode, display, on the display (e.g., the display 360 of FIG. 3), the image received in realtime through the camera module 380.

According to yet another embodiment, the electronic device may recognize the faces of the plurality of subjects included in the image received in the capture mode, using the face recognition function. The electronic device may detect at least one piece of face recognition information (e.g., name or nickname) based on the at least one recognized face, based on the face recognition information which is mapped to the face information (e.g., face feature information) and stored in the memory (e.g., the memory 330 of FIG. 2).

In operation 903, the electronic device (e.g., the electronic device 101 of FIG. 1 or the electronic device 301 of FIG. 3) may identify the presence of one piece of face recognition information mapped with gaze calibration information among at least one piece of face recognition information.

According to yet another embodiment, the electronic device may recognize the gaze of at least one subject corresponding to the at least one piece of face recognition information among the plurality of subjects included in the image received in the capture mode, using a gaze calibration function.

For example, the electronic device may compare when the subject gazes at a specific portion of each edge of the display 360 in the capture mode and when the subject gazes at the front surface of the camera module 380 and store changes in the moving distance and angle of the pupil of the gaze and store it as gaze calibration information. The gaze calibration information may be for precisely calculating the direction of the gaze and may differ per subject.

According to yet another embodiment, the electronic device may map the at least one piece of face recognition information and the at least one piece of gaze calibration information and store them in the memory (e.g., the memory 330).

According to yet another embodiment, the electronic device may identify the presence of one piece of face recognition information mapped with gaze calibration information among the at least one piece of face recognition information based on the mapping information about the at least one piece of face recognition information and the at least one piece of gaze calibration information stored in the memory.

In operation 905, the electronic device (e.g., the electronic device 101 of FIG. 1 or the electronic device 301 of FIG. 3) may determine the subject corresponding to one piece of face recognition information as the capturer.

In operation 907, the electronic device (e.g., the electronic device 101 of FIG. 1 or the electronic device 301 of FIG. 3) may perform a first image capturing function of displaying the captured image on the display if the capturer gazes at the capture button.

According to yet another embodiment, if the gaze of the determined capturer is at the capture button, the electronic device may perform the first image capturing function of capturing an image and displaying the captured image on the display 360.

Figure 10:
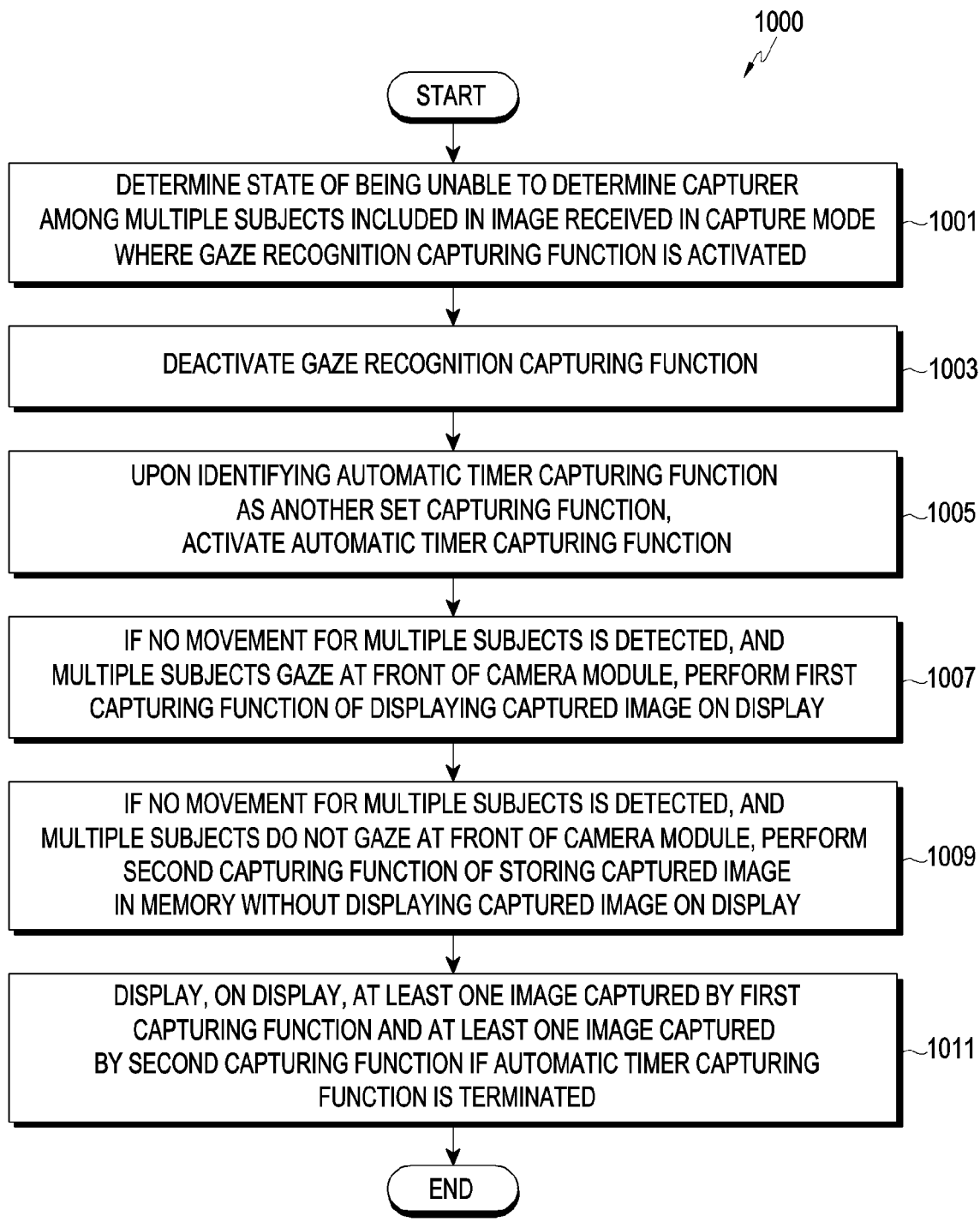
FIG. 10 is a flowchart illustrating an operation of performing a capturing function in an electronic device according to an embodiment of the disclosure.

FIG. 10 is a flowchart 1000 illustrating an operation of performing a capturing function in an electronic device according to an embodiment of the disclosure.

Referring to FIG. 10, in a method 1000, the operations of performing the capturing function may include operations 1001 to 1011. According to an embodiment, at least one of operations 1001 to 1011 may be omitted or changed in order or may add other operations. Operations 1001 to 1011 may be performed by, e.g., a component (e.g., the processor 120 of FIG. 1 or the processor 320 of FIG. 3) of an electronic device (e.g., the electronic device 101 of FIG. 1 or the electronic device 301 of FIG. 3).

In operation 1001, the electronic device (e.g., the electronic device 101 of FIG. 1 or the electronic device 301 of FIG. 3) may determine the state of being unable to determine the capturer among the plurality of subjects included in the image received in the capture mode in which the gaze recognition capturing function is activated.

According to an embodiment, upon failing to recognize a face in the image received in the capture mode, the electronic device may determine that it is the state of being unable to determine the capturer.

According to another embodiment, if there is no face recognition information mapped with the gaze calibration information among the at least one piece of face recognition information based on the mapping information about the at least one piece of face recognition information and the at least one piece of gaze calibration information stored in the memory (e.g., the memory 330 of FIG. 3), the electronic device may determine that it is the state of being unable to determine the capturer.

According to yet another embodiment, the electronic device may identify the presence of at least two pieces of face recognition information mapped with gaze calibration information among the at least one piece of face recognition information based on the mapping information about the at least one piece of face recognition information and the at least one piece of gaze calibration information stored in the memory. The electronic device may detect score information about at least two pieces of face recognition information using depth information and body information about each of at least two subjects corresponding to the at least two pieces of face recognition information and, if the highest score information among the respective score information of the at least two pieces of face recognition information is equal to or smaller than the threshold pre-stored in the memory 330, determine that it is the state of being unable to determine the capturer.

In operation 1003, the electronic device (e.g., the electronic device 101 of FIG. 1 or the electronic device 301 of FIG. 3) may deactivate the gaze recognition capturing function.

In operation 1005, upon identifying the automatic timer capturing function as another set capturing function, the electronic device (e.g., the electronic device 101 of FIG. 1 or the electronic device 301 of FIG. 3) may activate the automatic timer capturing function.

In operation 1007, if no movement for the plurality of subjects is detected, and the plurality of subjects gaze at the front of the camera module, the electronic device (e.g., the electronic device 101 of FIG. 1 or the electronic device 301 of FIG. 3) may perform a first image capturing function of displaying the captured image on the display (e.g., the display 360 of FIG. 3).

According to yet another embodiment, if the automatic timer capturing function is activated, the electronic device may detect whether the plurality of subjects included in the image received in the capture mode move and, upon detecting no movement of the plurality of subjects, detect whether the plurality of subjects gaze at the front of the camera module (e.g., the camera module 380 of FIG. 3). If the plurality of subjects are detected as gazing at the front of the camera module, the electronic device may perform the first image capturing function of capturing an image and displaying the captured image on the display (e.g., the display 360 of FIG. 3).

In operation 1009, if no movement for the plurality of subjects is detected, and the plurality of subjects do not gaze at the front of the camera module, the electronic device (e.g., the electronic device 101 of FIG. 1 or the electronic device 301 of FIG. 3) may perform a second image capturing function of storing the captured image in the memory without displaying the captured image on the display.

According to yet another embodiment, if the automatic timer capturing function is activated, the electronic device may detect whether the plurality of subjects included in the image received in the capture mode move and, upon detecting no movement of the plurality of subjects, detect whether the plurality of subjects gaze at the front of the camera module (e.g., the camera module 380 of FIG. 3). Upon detecting that the plurality of subjects do not gaze at the front of the camera module (e.g., the camera module 380 of FIG. 3), the electronic device may capture an image every predetermined time and perform the second image capturing function of storing the captured images in the memory (e.g., the memory 330 of FIG. 3) without displaying the captured images on the display (e.g., the display 360 of FIG. 3).

In operation 1011, if the automatic timer capturing function is terminated, the electronic device (e.g., the electronic device 101 of FIG. 1 or the electronic device 301 of FIG. 3) may display, on the display (e.g., the display 360 of FIG. 3), at least one image captured by the first image capturing function or at least one image captured by the second image capturing function.

According to yet another embodiment, the electronic device may determine when the plurality of subjects gaze at the front of the camera module (e.g., the camera module 380) and when the plurality of subjects do not gaze at the front of the camera module while performing the first image capturing function and the second image capturing function.

According to yet another embodiment, if the time of the automatic timer expires so that the automatic timer capturing function is terminated, the electronic device may display, on the display, at least one image captured by the first capturing function and at least one image captured by the second capturing function.

According to various embodiments, a method for performing a capturing function in an electronic device may comprise detecting at least one piece of face recognition information based on a plurality of subjects included in an image received in a capture mode where a gaze recognition capturing function is activated, upon identifying a presence of at least two pieces of face recognition information mapped with gaze calibration information among the at least one piece of face recognition information, detecting score information about the at least two pieces of face recognition information based on depth information and body information, determining that a subject corresponding to face recognition information including highest score information among the at least two pieces of face recognition information is a capturer, and if the determined capturer gazes at a capture button, performing a first image capturing function of displaying a captured image on a display of the electronic device.

According to various embodiments, detecting the at least one piece of face recognition information may include recognizing a face of at least one of the plurality of subjects included in the image received in the capture mode and detecting the at least one piece of face recognition information corresponding to the at least one recognized face.

According to various embodiments, the method may further comprise detecting at least one piece of gaze calibration information by performing a gaze calibration operation on at least one subject corresponding to the at least one piece of face recognition information and mapping and storing the at least one piece of face recognition information and the at least one piece of gaze calibration information.

According to various embodiments, the method may further comprise detecting distance information between the camera module and each of at least two subjects corresponding to the at least two pieces of face recognition information, as the depth information.

According to various embodiments, the method may further comprise detecting the body information based on skeleton information about each of at least two subjects corresponding to the at least two pieces of face recognition information.

According to various embodiments, determining that the subject is the capturer may include determining the face recognition information having the highest score information among the at least two pieces of face recognition information and, if the highest score information is a threshold or more, determining the subject corresponding to the face recognition information having the highest score information, as the capturer.

According to various embodiments, the method may further comprise, upon identifying a presence of one piece of face recognition information mapped with the gaze calibration information among the at least one piece of face recognition information, determining that a subject corresponding to the one piece of face recognition information is the capturer and, if the determined capturer gazes at the capture button, performing the first image capturing function.

According to various embodiments, the method may further comprise deactivating a gaze recognition capturing function and activating another set capturing function if becoming a state of being unable to determine the capturer.

According to various embodiments, the method may further comprise, if an automatic timer capturing function is activated as the other set capturing function, detecting whether there is a movement for the plurality of subjects included in the image, if the movement for the plurality of subjects is not detected, detecting whether the plurality of subjects gaze at a front of the camera module, upon detecting that the plurality of subjects gaze at the front of the camera module, performing the first image capturing function, and upon detecting that the plurality of subjects do not gaze at the front of the camera module, performing a second image capturing function of not displaying the captured image on the display, every predetermined time.

According to various embodiments, the method may further comprise displaying, on the display, at least one image captured by the first image capturing function and at least one image captured by the second image capturing function.

According to various embodiments, when the automatic timer capturing function is terminated, the method further comprises displaying at least one image captured by the first image capturing function or at least one image captured by the second image capturing function.

According to various embodiments, when the automatic timer capturing function expires, the method further comprises displaying at least one image captured by the first image capturing function and at least one image captured by the second image capturing function.

According to various embodiments, the method may further comprise determining that state of being unable to determine the capturer occurs based on there is no face recognition information mapped with the gaze calibration information among the at least one piece of face recognition information based on mapping information about the at least one piece of face recognition information and at least one piece of gaze calibration information stored in a memory.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101 or the electronic device 501). For example, a processor (e.g., the processor 120) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a display;
   memory storing one or more computer programs; and
   one or more processors communicatively coupled to the camera, the display, and the memory,
   wherein the memory store one or more computer programs include computer-executable instructions that, when executed by the one or more processors individually or collectively, cause the electronic device to:
   detect at least one piece of face recognition information based on a plurality of subjects included in an image received in a capture mode where a gaze recognition capturing function is activated, the face recognition information being detected by comparing when one of the plurality of subjects gazes at a specific portion of each edge of the display in the capture mode and when the subject gazes at a front of the camera,
   upon identifying a presence of at least two pieces of face recognition information mapped with gaze calibration information among the at least one piece of face recognition information, detect score information about the at least two pieces of face recognition information based on depth information and body information, determine that a subject corresponding to face recognition information including highest score information among the at least two pieces of face recognition information is a capturer, and when the determined capturer gazes at a capture button, perform a first image capturing function of displaying a captured image on the display.

2. The electronic device of claim 1, wherein the one or more computer programs further include computer-executable instructions that, when executed by the one or more processors individually or collectively, cause the electronic device to:

recognize at least one face among the plurality of subjects included in the image received in the capture mode, and detect the at least one piece of face recognition information corresponding to the at least one recognized face.

3. The electronic device of claim 1, wherein the one or more computer programs further include computer-executable instructions that, when executed by the one or more processors individually or collectively, cause the electronic device to:

detect at least one piece of gaze calibration information by performing a gaze calibration operation on at least one subject corresponding to the at least one piece of face recognition information, and map and store the at least one piece of face recognition information and the at least one piece of gaze calibration information.

4. The electronic device of claim 1, wherein the one or more computer programs further include computer-executable instructions that, when executed by the one or more processors individually or collectively, cause the electronic device to detect distance information between the camera and each of at least two subjects corresponding to the at least two pieces of face recognition information, as the depth information.

5. The electronic device of claim 1, wherein the one or more computer programs further include computer-executable instructions that, when executed by the one or more processors individually or collectively, cause the electronic device to detect the body information based on skeleton information about each of at least two subjects corresponding to the at least two pieces of face recognition information.

6. The electronic device of claim 1, wherein the one or more computer programs further include computer-executable instructions that, when executed by the one or more processors individually or collectively, cause the electronic device to:

determine the face recognition information having the highest score information among the at least two pieces of face recognition information, and when the highest score information is greater or equal to a threshold, determine the subject corresponding to the face recognition information having the highest score information is the capturer.

7. The electronic device of claim 1, wherein the one or more computer programs further include computer-executable instructions that, when executed by the one or more processors individually or collectively, cause the electronic device to:

upon identifying a presence of one piece of face recognition information mapped with the gaze calibration information among the at least one piece of face recognition information;

determine that a subject corresponding to the one piece of face recognition information is the capturer; and when the determined capturer gazes at the capture button, perform the first image capturing function.

8. The electronic device of claim 1, wherein the one or more computer programs further include computer-executable instructions that, when executed by the one or more processors individually or collectively, cause the electronic device to:

deactivate a gaze recognition capturing function when a state of being unable to determine the capturer occurs; and activate another set capturing function.

9. The electronic device of claim 8, wherein the one or more computer programs further include computer-executable instructions that, when executed by the one or more processors individually or collectively, cause the electronic device to:

when an automatic timer capturing function is activated as the other set capturing function, detect whether there is a movement for the plurality of subjects included in the image;

when the movement for the plurality of subjects is not detected, detect whether the plurality of subjects gaze at the front of the camera;

upon detecting that the plurality of subjects gaze at the front of the camera, perform the first image capturing function; and upon detecting that the plurality of subjects do not gaze at the front of the camera, perform a second image capturing function of not displaying the captured image on the display, every predetermined time.

10. The electronic device of claim 9, wherein the one or more computer programs further include computer-executable instructions that, when executed by the one or more processors individually or collectively, cause the electronic device to display, on the display, at least one image captured by the first image capturing function and at least one image captured by the second image capturing function.

11. A method for performing a capturing function in an electronic device, the method comprising:

detecting, by the electronic device, at least one piece of face recognition information based on a plurality of subjects included in an image received in a capture mode where a gaze recognition capturing function is activated, the face recognition information being detected by comparing when one of the plurality of subjects gazing at a specific portion of each edge of a display of the electronic device in the capture mode and when the subject gazes at a front of a camera of the electronic device;

upon identifying a presence of at least two pieces of face recognition information mapped with gaze calibration information among the at least one piece of face recognition information, detecting, by the electronic device, score information about the at least two pieces of face recognition information based on depth information and body information;

determining, by the electronic device, that a subject corresponding to face recognition information including highest score information among the at least two pieces of face recognition information is a capturer; and when the determined capturer gazes at a capture button, performing, by the electronic device, a first image capturing function of displaying a captured image on the display of the electronic device.

12. The method of claim 11, wherein the detecting of the at least one piece of face recognition information includes:

recognizing a face of at least one of the plurality of subjects included in the image received in the capture mode; and detecting the at least one piece of face recognition information corresponding to the at least one recognized face.

13. The method of claim 11, further comprising:

detecting at least one piece of gaze calibration information by performing a gaze calibration operation on at least one subject corresponding to the at least one piece of face recognition information; and mapping and storing the at least one piece of face recognition information and the at least one piece of gaze calibration information.

14. The method of claim 11, further comprising detecting distance information between the camera of the electronic device and each of at least two subjects corresponding to the at least two pieces of face recognition information, as the depth information.

15. The method of claim 11, further comprising detecting the body information based on skeleton information about each of at least two subjects corresponding to the at least two pieces of face recognition information.

16. The method of claim 11, wherein the determining of that the subject is the capturer includes:

determining face recognition information having the highest score information among the at least two pieces of face recognition information; and when the highest score information is a threshold or more, determining that the subject corresponding to the face recognition information having the highest score information is the capturer.

17. The method of claim 11, further comprising:

upon identifying a presence of one piece of face recognition information mapped with the gaze calibration information among the at least one piece of face recognition information, determining that a subject corresponding to the one piece of face recognition information is the capturer; and when the determined capturer gazes at the capture button, performing the first image capturing function.

18. The method of claim 11, further comprising:

deactivating a gaze recognition capturing function when a state of being unable to determine the capturer occurs; and activating another set capturing function.

19. The method of claim 18, further comprising:

when an automatic timer capturing function is activated as the other set capturing function, detecting whether there is a movement for the plurality of subjects included in the image;

when the movement for the plurality of subjects is not detected, detecting whether the plurality of subjects gaze at the front of the camera;

upon detecting that the plurality of subjects gaze at the front of the camera, performing the first image capturing function; and upon detecting that the plurality of subjects do not gaze at the front of the camera, performing a second image capturing function of not displaying the captured image on the display, every predetermined time.

20. The method of claim 19, further comprising displaying, on the display, at least one image captured by the first image capturing function and at least one image captured by the second image capturing function.

* * * * *